United States Patent
Vijay et al.

(10) Patent No.: US 12,154,315 B2
(45) Date of Patent: Nov. 26, 2024

(54) GROUPING CLOTHING IMAGES OF BRANDS USING VECTOR REPRESENTATIONS

(71) Applicant: CurioSearch DBA Materiall, Milpitas, CA (US)

(72) Inventors: Bharat Vijay, Fremont, CA (US); Christopher Fase Sandman, Atlanta, GA (US); Kyle Allen Norton, Atlanta, GA (US); Ayyar Arun Balavenkatasubramanian, Chennai (IN); Srihari Padmanaban Venkatesan, Chennai (IN)

(73) Assignee: Unisense Tech, Inc., Milpitas, CA (US)

( * ) Notice: Subject to any disclaimer, the term of this patent is extended or adjusted under 35 U.S.C. 154(b) by 386 days.

(21) Appl. No.: 17/570,342

(22) Filed: Jan. 6, 2022

(65) Prior Publication Data

US 2023/0215137 A1    Jul. 6, 2023

(51) Int. Cl.

| | |
|---|---|
| *G06V 10/762* | (2022.01) |
| *G06N 3/08* | (2023.01) |
| *G06Q 30/0601* | (2023.01) |
| *G06V 10/26* | (2022.01) |
| *G06V 10/40* | (2022.01) |
| *G06V 10/74* | (2022.01) |
| *G06V 10/82* | (2022.01) |

(52) U.S. Cl.
CPC ............. *G06V 10/763* (2022.01); *G06N 3/08* (2013.01); *G06Q 30/0603* (2013.01); *G06Q 30/0643* (2013.01); *G06V 10/267* (2022.01); *G06V 10/40* (2022.01); *G06V 10/761* (2022.01); *G06V 10/82* (2022.01)

(58) Field of Classification Search
CPC .... G06V 10/763; G06V 10/267; G06V 10/40; G06V 10/761; G06V 10/82; G06V 10/454; G06V 10/764; G06V 40/10; G06Q 30/0603; G06Q 30/0643; G06Q 30/0631; G06N 3/08; G06N 20/00; G06N 3/045; G06N 7/01
See application file for complete search history.

(56) References Cited

U.S. PATENT DOCUMENTS

| | | |
|---|---|---|
| 8,103,551 B2 | 1/2012 | Saul et al. |
| 8,798,362 B2 | 8/2014 | Wang et al. |
| 10,795,933 B1 * | 10/2020 | Langley ................. G06N 5/046 |
| 2009/0116698 A1 | 5/2009 | Zhang et al. |

(Continued)

*Primary Examiner* — Marcos L Torres
(74) *Attorney, Agent, or Firm* — Vani Moodley, Esq.

(57) ABSTRACT

Described herein is a system and computer implemented method of grouping clothing products by brands within a set of clothing images in an electronic catalog of an internet store serving online customers. Apply an object detection model to extract the dress section within the clothing image(s) to create preprocessed image(s). A machine learning model model is applied to the preprocessed image(s) to convert the image into a vector representation through an unsupervised technique. The vector contains the design features of the clothing image. The design features are representative of the brands. A clustering model is applied on the vector representations to arrive at the grouping of similar images of the clothing products. The grouped clothing products are displayed via a user interface, ordered by brands, to the online customers.

14 Claims, 13 Drawing Sheets

(56) References Cited

U.S. PATENT DOCUMENTS

| | | | | |
|---|---|---|---|---|
| 2020/0042822 A1* | 2/2020 | Chae | ................... | G06F 18/2413 |
| 2022/0259787 A1* | 8/2022 | Mashal | ................... | D06F 34/18 |
| 2023/0069541 A1* | 3/2023 | Acharya | ............ | G06Q 30/0643 |
| 2023/0186614 A1* | 6/2023 | Amrani | ..................... | G06T 5/70 |
| | | | | 382/103 |

* cited by examiner

| BRANDS | NUMBER OF IMAGES |
|---|---|
| Nike | 655 |
| Fifth sun | 511 |
| Hugo Boss | 291 |
| Marvel | 247 |
| LA Pop Art | 231 |
| Mitchell & Ness | 194 |
| Polo Ralph Lauren | 137 |
| 47 brand | 130 |

FIG. 10

GROUPING CLOTHING IMAGES OF BRANDS USING VECTOR REPRESENTATIONS

BACKGROUND

This invention in general relates to a method of ecommerce and specifically to selection of items in an online store.

Consider an electronic catalog presented on an online store to a consumer. Apparel in the electronic catalog may belong to different brands, and in many cases there is no pre-classification by brand available in the online store, and neither is a label printed on the apparel to clearly distinguish the brand.

Most apparel today follow the "label-less" trend, and the individual style of the clothing differentiates the brand.

Brands position themselves to specific customer profiles and their unique preferences. The brand is among the top decision-making preferences of a consumer in apparel selection. Typically, even though a customer may conduct a search for a particular style of apparel, they would like to view all apparel with their preferred style within their own brand of choice.

SUMMARY OF THE INVENTION

The method and system of this invention addresses the above unmet need of presenting apparel of a particular style, grouped by brands, in an environment wherein there is no pre-classification by brand available in the online store, and neither is a label printed on the apparel to clearly distinguish the brand.

Described herein is a system and computer implemented method of grouping clothing products by brands in a set of clothing images in an electronic catalog of an internet store serving online customers. Apply an object detection model to extract the dress section within the clothing image(s) to create preprocessed image(s). Apply a machine learning model model on the preprocessed image(s) to convert the image into a vector representation through an unsupervised technique. The vector contains the design features of the clothing image. The design features are representative of the brands. Apply a clustering model on the vector representations to arrive at the grouping of similar images of the clothing products. Display on a user interface the grouped clothing products by brands to the online customers. The captured salient design features comprises one or more of design of collar, shape of collar, shape of sleeve, and text and numbering content of said preprocessed image.

A BYOL model is applied to convert the image into vector representations.

A t distributed-Stochastic Neighbour Embedding model is applied to the vector representation for dimensionality reduction.

An elbow method is applied to select the optimal 'K' for the lower dimension data obtained after said dimensionality reduction, and a K-means clustering method is applied to form the clusters.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system for grouping clothing products by brands within a plurality of clothing images in an electronic catalog of an internet store serving online customers. The system also includes a processor; a memory containing instructions, when executed by the processor, configure the system to: apply an object detection model to extract dress sections within the plurality of clothing images to create a plurality of preprocessed images; apply a machine learning model on said plurality of preprocessed images to convert said plurality of preprocessed images into a vector representation through an unsupervised technique, where said vector representation is a mathematical representation of design features of said plurality of clothing images, and where said design features are representative of said brands; apply a clustering model on said vector representations to arrive at a grouping of similar images of said clothing products; and display on a user interface said grouped clothing products by said brands. Other embodiments of this aspect include corresponding computer systems, apparatus, and computer programs recorded on one or more computer storage devices, each configured to perform the actions of the methods.

Implementations may include one or more of the following features. The system where said design features may include one or more of design of collar, shape of collar, shape of sleeve, and text and numbering content of said preprocessed image. Said object detection model is a you look only once (YOLO) model. Said machine learning model is a bootstrap your own latent (BYOL) model. Said BYOL model is utilized to train an online neural network based on an augmented view of said image to predict a target network's representation of another augmented view of the said image. A t-distributed stochastic neighbour embedding model is applied to vector embeddings of said BYOL model. An elbow method is applied to select an optimal k value for lower dimension data obtained after a dimensionality reduction, and a k-means clustering method is applied to form the clusters. Extracting the dress section further may include applying a category detection model. Said clustering model is a k means unsupervised learning model. Implementations of the described techniques may include hardware, a method or process, or computer software on a computer-accessible medium.

One general aspect includes a computer implemented method of grouping clothing products by brands in a set of clothing images in an electronic catalog of an internet store serving online customers. The computer implemented method of grouping clothing products also includes applying an object detection model to extract a dress section within said set of clothing images to create a preprocessed image; applying a machine learning model on said preprocessed image to convert said image into a vector representation through an unsupervised technique, where said vector representation is a mathematical representation of design features of said clothing image, and where said design features are representative of said brands; applying a clustering model on said vector representation to arrive at a grouping of similar images of said clothing products; and displaying on a user interface said grouped clothing products by said brands. Other embodiments of this aspect include corresponding computer systems, apparatus, and computer programs recorded on one or more computer storage devices, each configured to perform the actions of the methods.

Implementations may include one or more of the following features. The method where said design features may include one or more of design of collar, shape of collar, shape of sleeve, and text and numbering content of said preprocessed image. Said object detection model is you only look once (YOLO) model. Said machine learning model is a bootstrap your own latent (BYOL) model. Said BYOL model is utilized to train an online neural network based on an augmented view of said image to predict a target network's representation of another augmented view of the said image. A t-distributed stochastic neighbour embedding model is applied to vector embeddings of said BYOL model. Extracting the dress section further may include applying a category detection model. Said clustering model is a k-means unsupervised learning model. An elbow method is applied to select an optimal k value for lower dimension data obtained after a dimensionality reduction, and a k-means clustering method is applied to form the clusters. Implementations of the described techniques may include hardware, a method or process, or computer software on a computer-accessible medium.

BRIEF DESCRIPTION OF DRAWINGS

FIG. 10 illustrates the number of images associated with each of the brands in the example.

DETAILED DESCRIPTION

Figure 1:
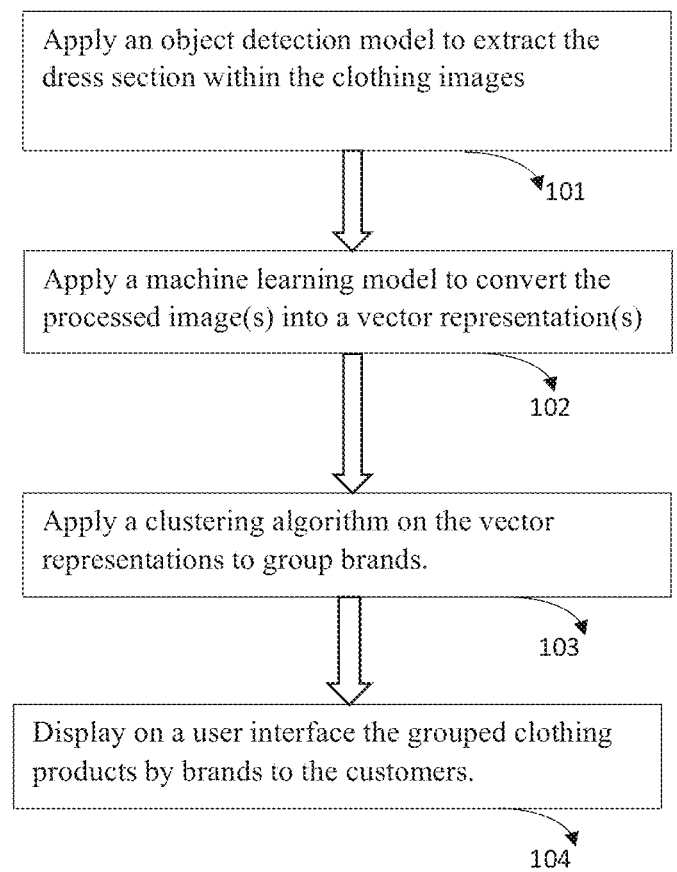
FIG. 1 illustrates the method of grouping brands of clothing products in a set of clothing images in an electronic catalog.

In the following description, for purposes of explanation, numerous specific details are set forth in order to provide a thorough understanding of the invention. It will be apparent, however, to one skilled in the art that the invention may be practiced without these specific details. In other instances, structures and devices are shown in block diagram form only in order to avoid obscuring the invention.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Described herein is a system and computer implemented method of grouping clothing products by brands in a set of clothing images in an electronic catalog of an internet store serving online customers. Apply an object detection model 101 to extract the dress section within the clothing image(s) to create preprocessed image(s). Apply a machine learning model model 102 on the preprocessed image(s) to convert the image into a vector representation through an unsupervised technique. The vector contains the design features of the clothing image. The design features are representative of the brands. Apply a clustering model 103 on the vector representations to arrive at the grouping of similar images of the clothing products. Display on a user interface 104 the grouped clothing products by brands to the online customers.

The method of extraction of the dress section within the image to create a pre-processed image is described in detail below.

Apply an attribute extraction model to identify the clothing attributes of the clothing image. Exemplarily, the clothing attributes comprises one or more of colour, sleeve length, dress category, dress length and other clothing style attributes.

The method of extraction of the dress section within the image to create a pre-processed image is described in detail below.

The method of extraction through object detection locates, identifies, and classifies a singular object, or identifies different parts of the object(s) in an image/video. The identified objects are represented using a bounding box (a rectangular box) marking the object's location. The region proposal-based and regression/classification-based methods are applied for object(s) detection.

In both region proposal-based and regression/classification-based methods, predict the following:
Class name
bx, by—bounding box center coordinates
bw—bounding box width
bh—bounding box height A regression-classification based model, e.g., YOLO (You Only Look Once) is advantageously applied for object detection for cloth category detection as it provides faster inference and higher accuracy.

Object detection in YOLO is conducted as a regression problem and provides the class probabilities of the detected images. The YOLO algorithm uses convolutional neural networks (CNN) to detect objects in real-time and requires only a single forward propagation through a neural network.

The YOLO algorithm works using the following three techniques (a) Residual blocks (b) Bounding box regression (c) Intersection Over Union (IOU) and Non-max suppression.

Figure 2A:
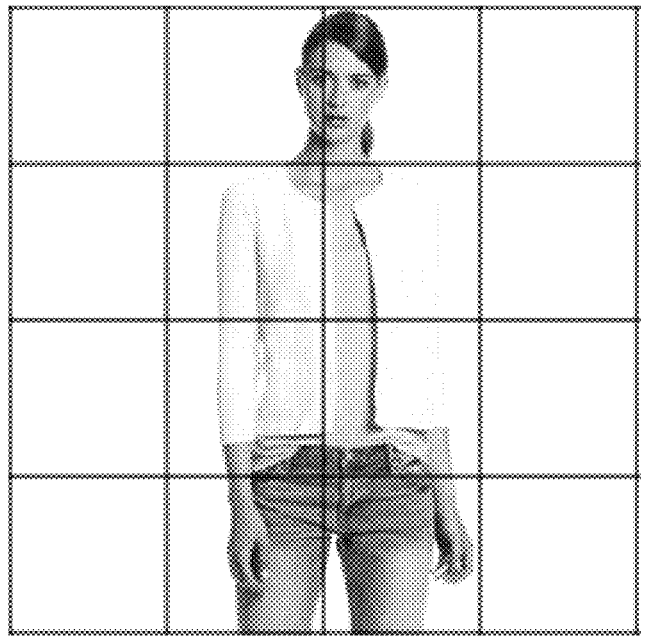
FIG. 2A illustrates the application of residual blocks to a clothed person.

The residual block technique is described herein. FIG. 2A illustrates the application of residual blocks to a clothed person.

The residual blocks algorithm divides the image into various grids. Each grid is a square of size 'S.' Every grid cell will detect objects that appear within them. For example, if an object center appears within a specific grid cell, this cell will be responsible for detecting it.

The bounding box regression technique is described herein.

Figure 2B:
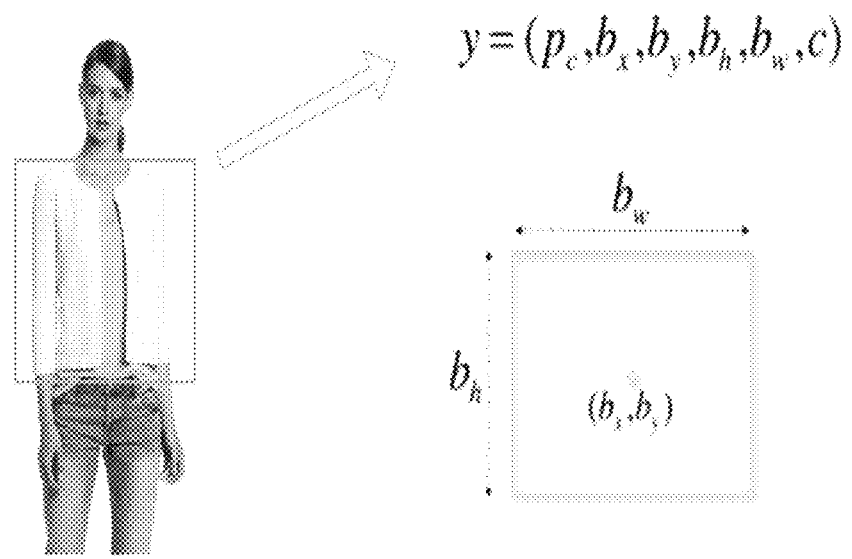
FIG. 2B illustrates the application of the bounding box to a clothed person.

FIG. 2B illustrates the application of the bounding box to a clothed person. Every bounding box in the image consists of the following attributes:
- pc—the probability of occurrence of a particular class inside the bounding box
- bx, by—bounding box center coordinates
- bw—bounding box width
- bh—bounding box height
- c—the class name An outline represents the bounding box. YOLO then performs regression to find the bounding box dimensions and classification to determine the class of the object.

Figure 3A:
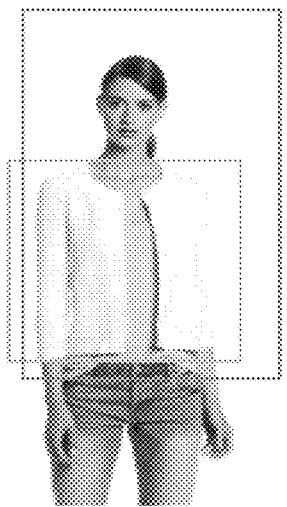
FIG. 3A illustrates an example of the Intersection over union (IOU) method.

The intersection Over Union and Non-max suppression model is described herein. FIG. 3A illustrates an example of the Intersection over union (IOU) method. Intersection over union (IOU) describes how boxes overlap. YOLO uses IOU to provide an output box that surrounds the objects perfectly. Each grid cell is responsible for predicting the bounding boxes and their confidence scores. The IOU equals 1 if the predicted bounding box is the same as the actual box. This mechanism eliminates bounding boxes that are not equal to the real bounding box.

There are two bounding boxes in the FIG. 3A: a larger box and a smaller box. The smaller box is the predicted box, while the larger box is the real box. Intersection over Union, will calculate the area of the intersection over union of these two boxes. The area of intersection: IoU=Area inside yellow box/Area inside green box. If IoU is greater than 0.5, the prediction is satisfactory. Exemplarily, 0.5 is an arbitrary threshold that changes according to a specific problem. Intuitively, higher the threshold, the better the accuracy of the predictions.

Figure 3B:
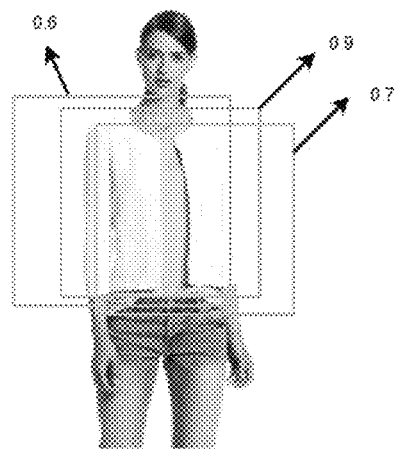
FIG. 3B illustrates the detection of an object multiple times.

In some cases, object detection algorithms may detect an object multiple times rather than detecting it once. FIG. 3B illustrates the detection of an object multiple times. The numbers in the figure are the probability pc. To avoid multiple detections, apply the Non-Max Suppression technique. The Non-max suppressing technique model will select the box with maximum probability and suppress the close-by boxes with non-max probabilities.

A combination of the methods of the residual block technique, bounding box regression technique and intersection Over Union and Non-max suppression model is described herein. First, the algorithm grids the image into cells. Each grid cell forecasts bounding boxes and provides their confidence scores. The cells predict the class probabilities to establish the class of each object.

Figure 4A:
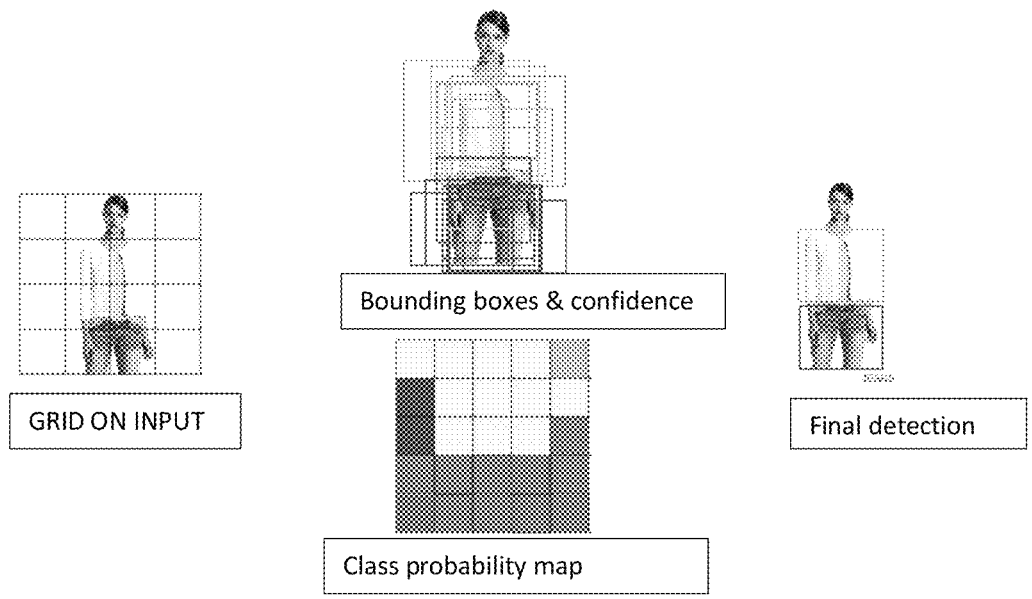
FIG. 4A illustrates two classes of objects: a blazer and a jeans.
Figure 4B:
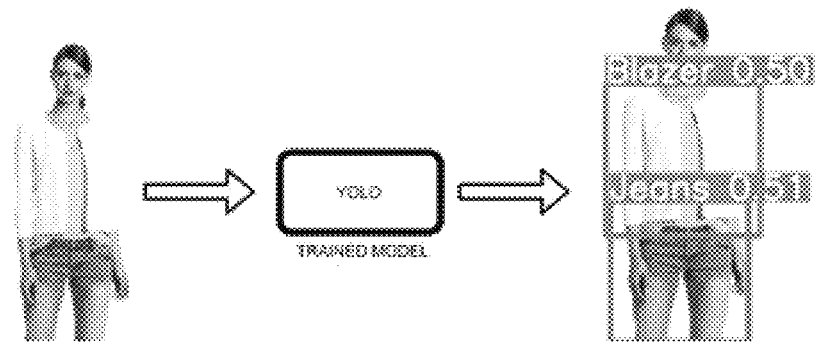
FIG. 4B illustrates the trained results of the object detection model.

FIG. 4A illustrates a category detection model using the above combination of methods. In FIG. 4B, there are at least two classes of objects: a blazer and jeans. All the predictions are made simultaneously using a single convolutional neural network. Intersection over union ensures that the predicted bounding boxes are equal to the real boxes of the objects. The non-max suppression selects the maximum probable box. The final detection will consist of unique bounding boxes that fit the objects perfectly.

An exemplary workflow is illustrated below (not restrictive to this list) for the object detection on the subset of a Deepfashion dataset.

The subset includes 28 different fashion items. ['Blouse', 'Blazer', 'Tee', 'Tank', 'Top', 'Sweater', 'Hoodie', 'Cardigan', 'Jacket', 'Skirt', 'Shorts', 'Jeans', 'Joggers', 'Sweatpants', 'Cutoffs', 'Sweatshorts', 'Leggings', 'Dress', 'Romper', 'Coat', 'Kimon o', 'Jumpsuit', 'Kurta', 'Pajamas', 'Patiala', 'Lehenga', 'Choli', 'Chudidar']

Train the YOLO model on the above subset.

The trained model is then used for inference.

The method of creating a vector representation of the extracted images from the electronic catalog is described below.

A machine learning model is applied to the preprocessed image to convert the image into a vector representation through an unsupervised technique. The vector contains the design features of the clothing image, and the design features are representative of corresponding brands. Bootstrap Your Own Latent (BYOL) is an example of such a machine learning model. The method of applying a BYOL algorithm to capture salient design features to generate a vector representation of clothing images in the catalog to arrive at similars of the salient design features, is described herein.

BYOL is a self-supervised learning model for image representations achieving better results than contrastive methods, without using negative pairs. BYOL is computationally less expensive than generative methods. BYOL applies an online and a target neural network to learn the image representation.

The prediction process implemented by the BYOL model is applied to the online network that serves the purpose of a learning network. The mean square error between the prediction of the BYOL model and the target networks projection is computed as the loss. The error is propagated backward in the online network, thereby tuning the network's weights.

BYOL techniques are utilized to determine (detect) the similarity between various views of an image. This similarity detection helps the BYOL model analyze the image's patterns and differentiates it from other images.

Described below is the implementation of a BYOL model on a clothing dataset. Consider an extensive collection of T-shirts. Train BYOL to learn the representation for every image in the dataset. The quantitative values described below are only exemplary and not restrictive.

Figure 5A:
FIGS. 5A, 5B and 5C illustrate a sample, random cropped, side flipped image respectively.
Figure 5B:
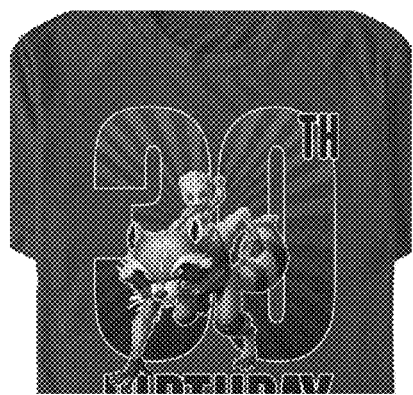
Figure 5C:

FIGS. 5A, 5B, and 5C illustrate a sample, random cropped, side flipped image respectively.

Sample an image from the dataset (FIG. 5A).

Two different views of the same image are created utilizing various augmentation techniques.

Random cropping: A random patch of the image is selected, with an area uniformly sampled between 8% and 100% of the original image, and an aspect ratio logarithmically sampled using a ratio value that lies between a ratio of 3/4 and 4/3. This patch is then resized to the target size of 224×224 using bicubic interpolation.

The image is Left-right flipped, as illustrated in FIG. 5C.

Figure 6A:
FIGS. 6A and 6B illustrate the image processed with color jittering and color dropping respectively.
Figure 6B:

FIG. 6A and FIG. 6B illustrate the image processed with color jittering and color dropping respectively.

Color jittering: The brightness, contrast, saturation and hue of the image are shifted by a uniformly random offset applied on all the same image pixels.

Color dropping: An optional conversion to grayscale. When applied color dropping is applied, output intensity for a pixel (r, g, b) corresponds to its luma component, computed as 0.2989r+0.5870g+0.1140b.

A suitable encoder is selected for use with the BYOL model. The encoder can be any residual network architecture, for example, Resnet-18 or Resnet 50. The choice of the encoder will decide the embedding size. For example, Resnet-18 transforms an image into an embedding vector of size 1024, while Resnet-50 transforms an image into an embedding vector of size 2048.

Figure 7:
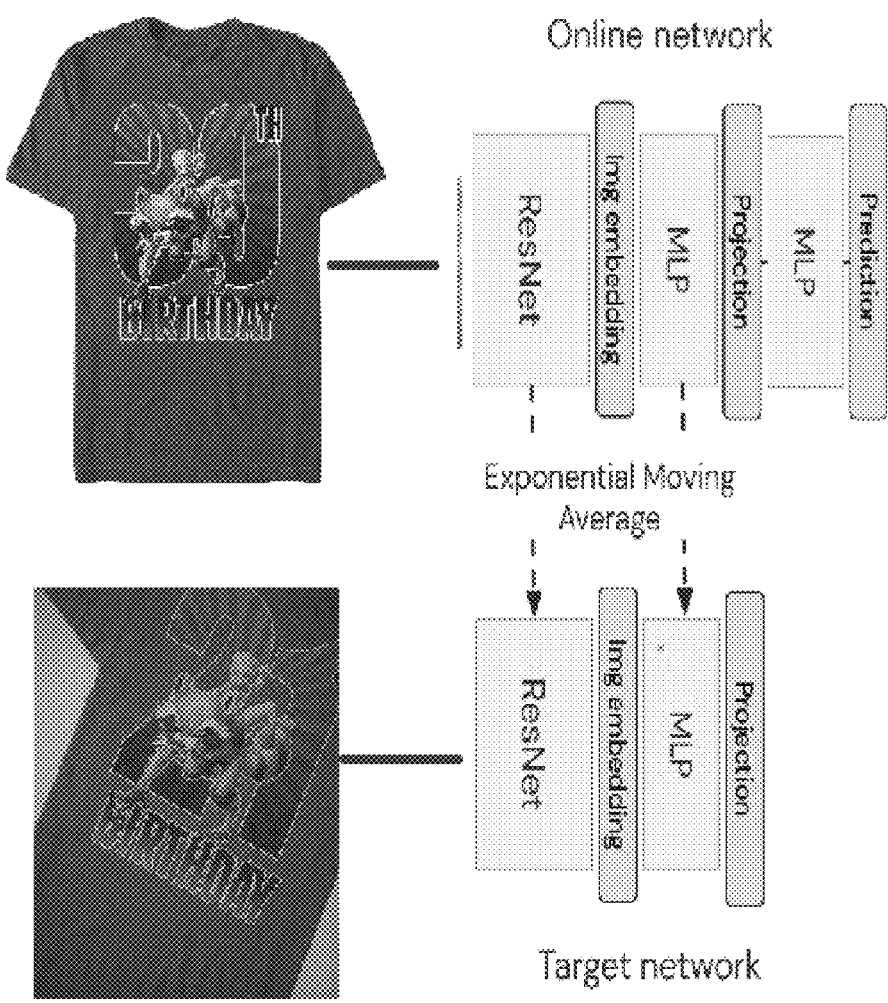
FIG. 7 illustrates the BYOL training process on a clothing image.

Train the BYOL model as follows. FIG. 7 illustrates the BYOL training process on a clothing image.

The above processes repeats for every image in the dataset. The online network weights get tuned during each step, thereby minimizing the prediction error between two different views of the same image. At the end of the training, store only the weights of the encoder (model), using which the representation for any new test image is determined.

Figure 8:
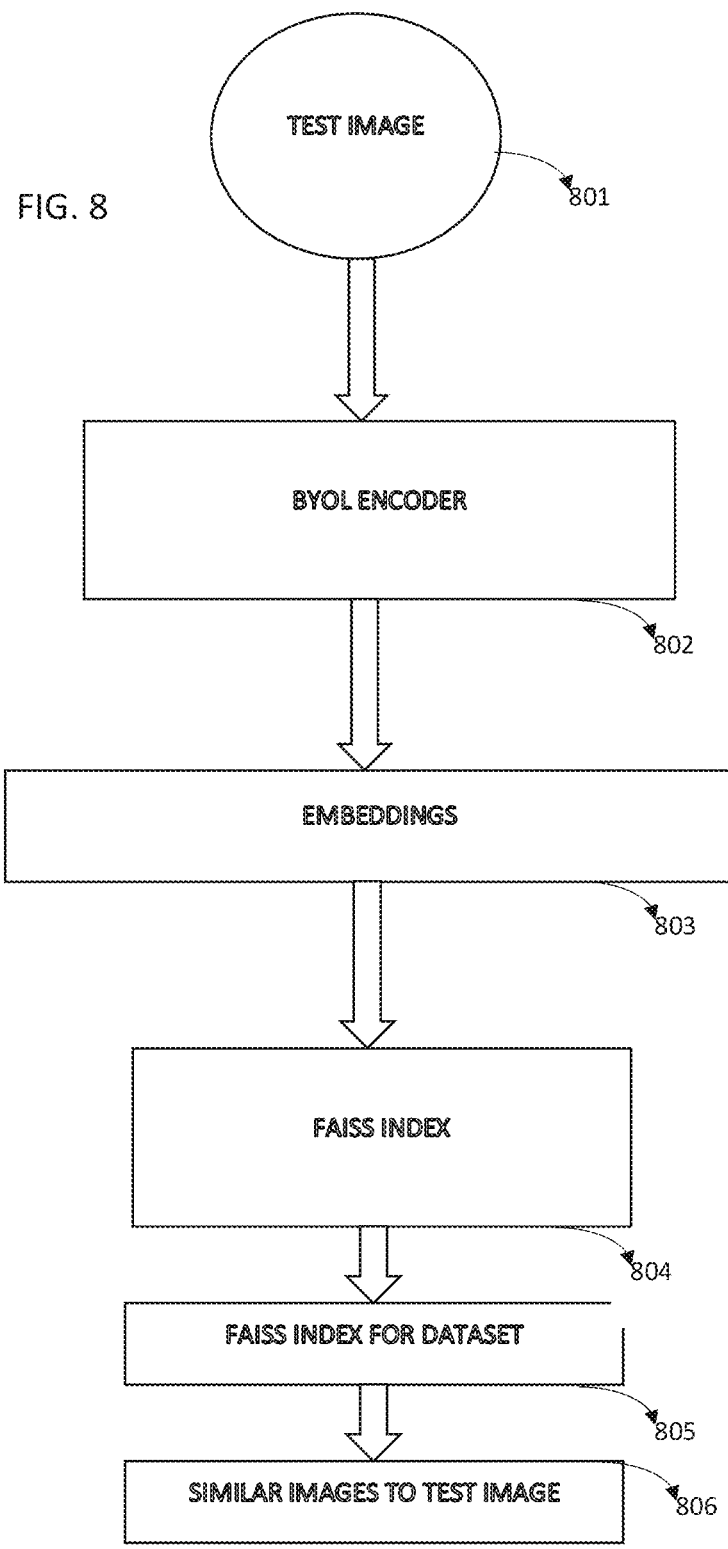
FIG. 8 illustrates the method of identifying similar images from a dataset given a test image.

FIG. 8 illustrates the method of identifying similar images from a dataset given a test image.

The following steps highlight the method of finding similar images from the dataset given a test image.

Find the embedding vector for every image in the dataset by performing a forward pass on the trained BYOL encoder 802 using all images from the dataset.

Use FAISS, a library for efficient similarity search and clustering of dense vectors. Create a FAISS index 804 from the embedding 803. This index is a sorted version of the embedding according to some metric (such as Euclidean distance).

Given a test image 801, find the embedding 803 and quickly locate the similar images 806 from the created FAISS index 805. If required, add the new image to the dataset and the embedding to the FAISS index 804.

For a given a set of vectors xi in dimension 'd', FAISS builds a data structure in RAM from it. After constructing the data structure, given a new vector x in size 'd', FAISS performs the following operation efficiently:

$$\text{argmin } i \|xi - x\|$$

where $\|.\|$ is the Euclidean distance ( ). FAISS finds the index 'i', which contains an embedding vector closest (similar) to the test image's embedding vector. The FAISS index is stored and used for finding similar images.

The method of applying a clustering algorithm on the vector representations to arrive at the grouping of the brands is described herein. Clustering is a process for grouping data, with data in each group sharing similarities in features.

One or more types of clustering methodologies may be supplied, such as K-means clustering and t-SNE clustering.

In the K-means clustering process, 'K' stands for the number of clusters of interest. The K means algorithm creates K-many distinct and non-overlapping clusters within a data set. The choice of 'K' requires domain knowledge, but there are certain statistical techniques (such as the elbow method) that helps in selecting the 'K'. The partitioning between clusters is accomplished by minimizing the sum of the mean squared error between each observation and the exact center point (or centroid) of the group to which that observation belongs. The choice of selection of the centroids is random for each trial.

The number of features for a dataset is called its dimensionality. The objective is to achieve dimensionality reduction by projecting the data to a lower-dimensional subspace that is computationally less expensive.

The t-SNE (t distributed-Stochastic Neighbour Embedding) algorithm can be efficiently applied to high dimensional data. It is a dimensionality reduction technique for effective visualization of data. Applying t-SNE to n-dimensional data will effectively map the n-dimensional data to 3-D or 2-D data.

t-SNE converts similarity distance, for example, measured by Euclidean metric, into a probability for each pair of points. The distance indicates the level of probability.

Figure 9:
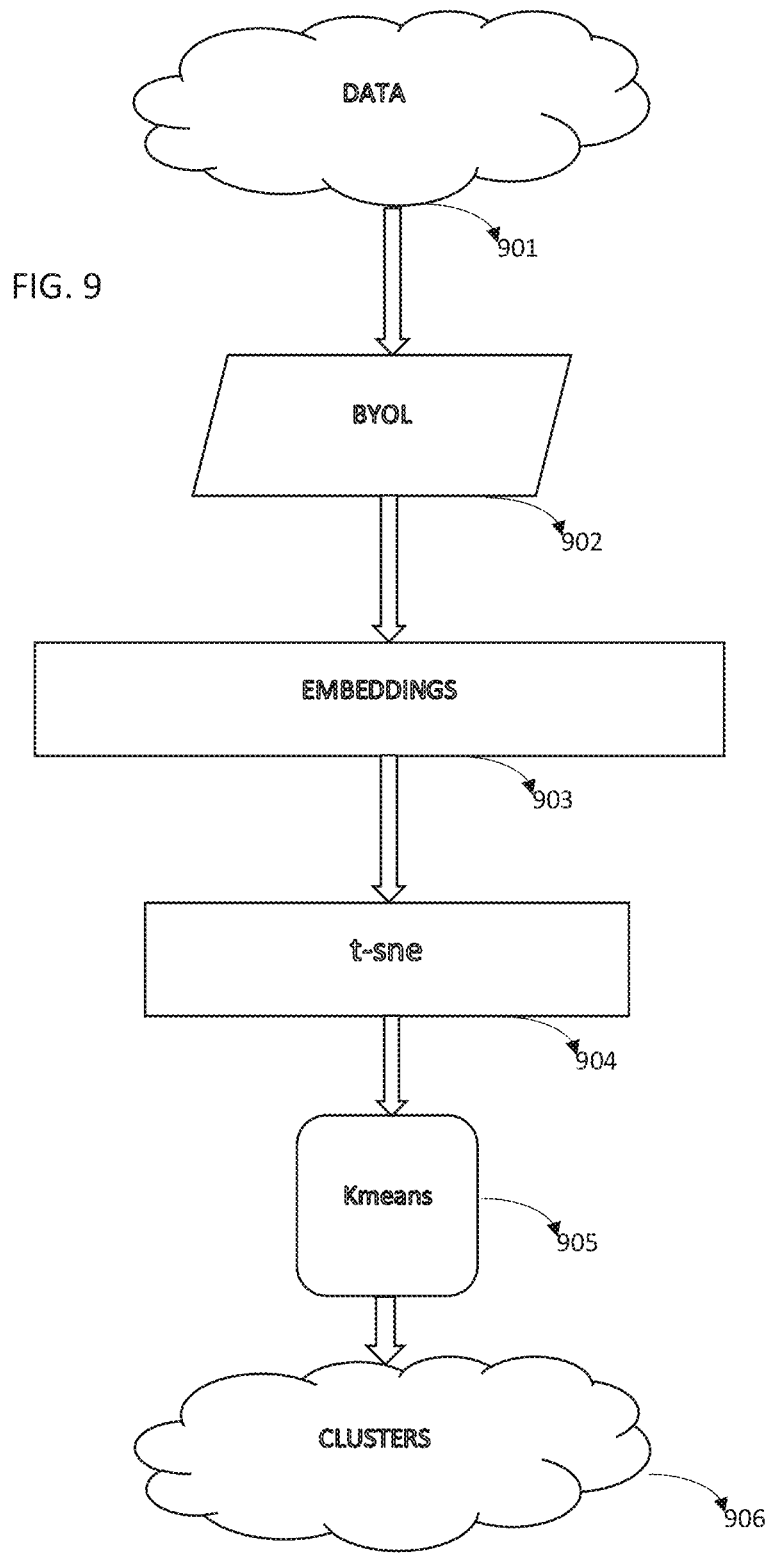
FIG. 9 illustrates the clustering methodology.

The clustering methodology includes the following processes. FIG. 9 illustrates the clustering methodology. Train the BYOL model 902 on the entire dataset 901. Get vector embeddings 903 (representations) for all images in the dataset using the trained BYOL model 902. Perform Dimensionality reduction (feature reduction) via t-SNE 904. Use elbow method to select the optimal 'K' for the lower dimension data obtained in the step above. Use K-means 905 to form the clusters 906.

The above mentioned clustering process is implemented on a subset of an online retailing store's dataset to cluster various fashion items according to their brands. For simplification, assume that the brand names for the images are known apriori.

Get the vector embeddings for the dataset using the BYOL model. The procedure for training and obtaining the vector embeddings was provided in the earlier section on the BYOL model.

FIG. 10 illustrates the number of images associated with each of the brands in the example.

Exemplarily, each vector embedding has a dimension of 2048. There are totally 2397 datapoints, each having a vector dimension of 2048.

Perform dimensionality reduction on this dataset using t-SNE to reduce the dimension of each data point to two or three. After this operation, there are totally 2397 datapoints, each having a vector dimension of 2/3.

Apply the elbow method to derive the optimal number of possible clusters from this data.

Figure 11:
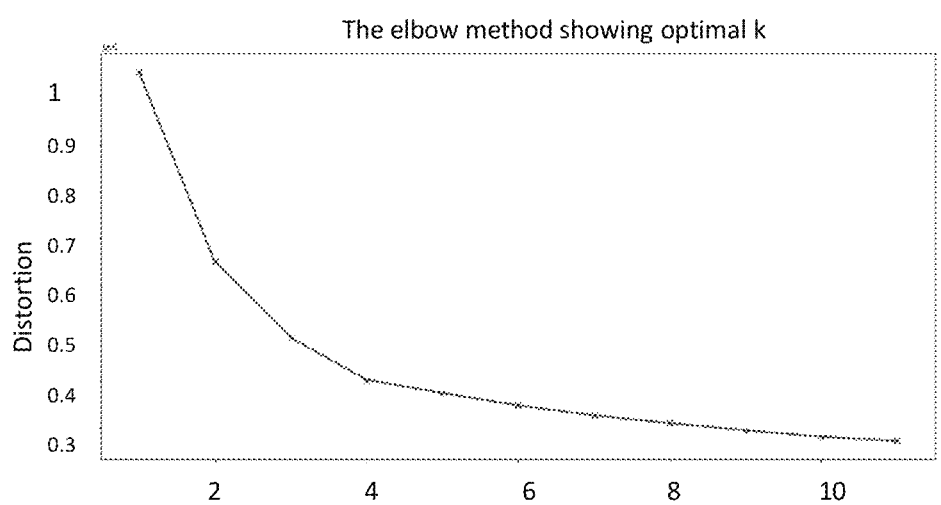
FIG. 11 illustrates the plot's "elbow", using K-means to cluster the data.

FIG. 11 illustrates the plot's "elbow". As exemplified in FIG. 11, on analysis of the plot's 'elbow,' the optimal 'K' could be 4, 5 or 6.

Use K-means to cluster the data. Since, in the exemplary case there are 8 brands, form 8 clusters; if not, use the optimal K.

Figure 12:
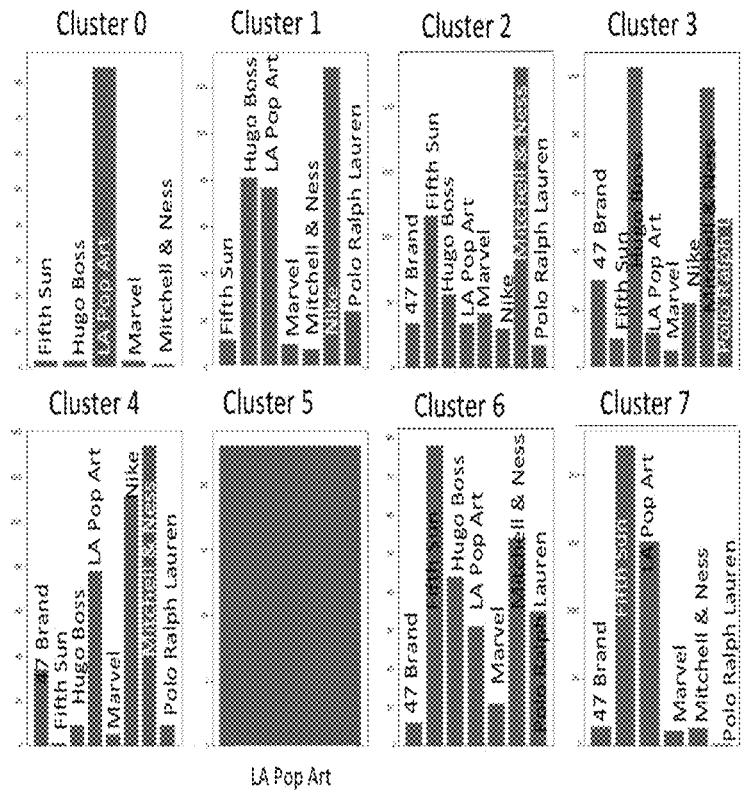
FIG. 12 illustrates how many images of a particular brand are in each cluster.

FIG. 12 illustrates how many images of a particular brand are in each cluster.

Figure 13:
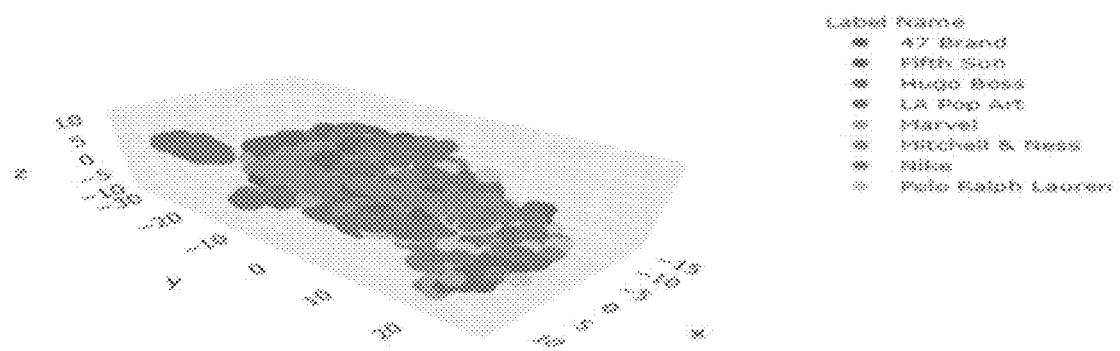
FIG. 13 depicts the clusters spread over a 3-D chart.

FIG. 13 depicts the clusters spread over a 3-D chart.

The processing steps described above may be implemented as modules or models. As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

In general, the modules/routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by a processor. Computing module might likewise include a read only memory ("ROM") or other static storage device coupled to bus for storing static information and instructions for processor.

The database module might include, for example, a media drive and a storage unit interface. The media drive might include a drive or other mechanism to support fixed or removable storage media. In alternative embodiments, the database modules might include other similar instrumentalities for allowing computer programs or other instructions or data to be loaded into the computing module. Such instrumentalities might include, for example, a fixed or removable storage unit and an interface.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for grouping clothing products by brands within a plurality of clothing images in an electronic catalog of an internet store serving online customers, comprising:
a processor; and
a memory containing instructions, when executed by the processor, configure the system to:
apply an object detection model to extract dress sections within the plurality of clothing images to create a plurality of preprocessed images;
apply a machine learning model on said plurality of preprocessed images to convert said plurality of preprocessed images into a vector representation through an unsupervised technique, wherein
said vector representation is a mathematical representation of design features of said plurality of clothing images,
said design features are representative of said brands,
said machine learning model is a Bootstrap Your Own Latent (BYOL) model,
said BYOL model is utilized to train an online neural network based on an augmented view of said plurality of preprocessed images to predict a target neural network's representation of another augmented view of the said plurality of preprocessed images, and
said BYOL model applies said trained online neural network and said target neural network to learn said vector representation;
apply a clustering model on said vector representations to arrive at a grouping of similar images of said clothing products; and
display on a user interface said grouped clothing products by said brands.

2. The system of claim 1, wherein said design features comprise one or more of design of collar, shape of collar, shape of sleeve, and text and numbering content of said preprocessed images.

3. The system of claim 1, wherein said object detection model is a You Look Only Once (YOLO) model.

4. The system of claim 1, wherein extracting the dress section further comprises applying a category detection model.

5. The system of claim 1, wherein said clustering model is a K Means unsupervised learning model.

6. The system of claim 1, wherein a t-distributed Stochastic Neighbour Embedding model is applied to vector embeddings of said BYOL model.

7. The system of claim 6, wherein an elbow method is applied to select an optimal K value for lower dimension data obtained after a dimensionality reduction, and a K-means clustering method is applied to form the clusters.

8. A computer implemented method of grouping clothing products by brands in a set of clothing images in an electronic catalog of an internet store serving online customers, comprising:

applying an object detection model to extract a dress section within said set of clothing images to create a plurality of preprocessed images;

applying a machine learning model on said plurality of preprocessed images to convert said image into a vector representation through an unsupervised technique, wherein said vector representation is a mathematical representation of design features of said clothing image, said design features are representative of said brands, said machine learning model is a Bootstrap Your Own Latent (BYOL) model, said BYOL model is utilized to train an online neural network based on an augmented view of said plurality of preprocessed images to predict a target neural network's representation of another augmented view of the said plurality of preprocessed images, and said BYOL model applies said trained online neural network and said target neural network to learn said vector representation;

applying a clustering model on said vector representation to arrive at a grouping of similar images of said clothing products; and displaying on a user interface said grouped clothing products by said brands.

9. The method of claim 8, wherein said design features comprise one or more of design of collar, shape of collar, shape of sleeve, and text and numbering content of said plurality of preprocessed images.

10. The method of claim 8, wherein said object detection model is a You Only Look Once (YOLO) model.

11. The method of claim 8, wherein extracting the dress section further comprises applying a category detection model.

12. The method of claim 8, wherein said clustering model is a K-Means unsupervised learning model.

13. The method of claim 8, wherein a t-distributed Stochastic Neighbour Embedding model is applied to vector embeddings of said BYOL model.

14. The method of claim 8, wherein an elbow method is applied to select an optimal K value for lower dimension data obtained after a dimensionality reduction, and a K-means clustering method is applied to form the clusters.

* * * * *